United States Patent
Yoshimi et al.

(10) Patent No.: US 6,690,628 B2
(45) Date of Patent: Feb. 10, 2004

(54) TRACKING ERROR SIGNAL COMPENSATION CIRCUIT AND TRACKING ERROR SIGNAL COMPENSATION METHOD

(75) Inventors: Takashi Yoshimi, Tokorozawa (JP); Eiji Nakajima, Tokorozawa (JP)

(73) Assignee: Pioneer Corporation, Tokyo-To (JP)

(*) Notice: Subject to any disclaimer, the term of this patent is extended or adjusted under 35 U.S.C. 154(b) by 0 days.

(21) Appl. No.: 10/313,101

(22) Filed: Dec. 5, 2002

(65) Prior Publication Data

US 2003/0117912 A1 Jun. 26, 2003

Related U.S. Application Data

(62) Division of application No. 09/393,107, filed on Sep. 9, 1999, now Pat. No. 6,526,006.

(30) Foreign Application Priority Data

Sep. 18, 1998 (JP) .......................................... P10-265499

(51) Int. Cl.$^7$ ................................................. G11B 7/00
(52) U.S. Cl. .................................................... 369/44.28
(58) Field of Search .......................... 369/44.27, 44.28, 369/44.29, 44.32, 44.25, 44.34

(56) References Cited

U.S. PATENT DOCUMENTS

| | | | |
|---|---|---|---|
| 5,537,374 A | * 7/1996 | Wachi | 369/44.28 |
| 5,760,991 A | 6/1998 | Semba | 369/44.28 |
| 5,896,365 A | 4/1999 | Hiroki | 369/275.3 |
| 5,982,722 A | 11/1999 | Hashimoto | 369/44.28 |
| 6,341,113 B1 | 1/2002 | Kamiyama | 369/53.15 |

* cited by examiner

*Primary Examiner*—Nabil Hindi
(74) *Attorney, Agent, or Firm*—Ladas & Parry

(57) ABSTRACT

A tracking error signal compensation device for removing an offset of a tracking error signal to be used for a tracking servo control includes: a low pass filter that extracts a direct current component and a low frequency component whose frequency is lower than a reference frequency from the tracking error signal, and generates a detection signal including the extracted direct current component and the extracted low frequency component; a determination device that determines whether or not a frequency of the tracking error signal is lower than a reference frequency; a holding device that generates a hold signal by holding the detection signal generated by the low pass filter, when the determination device determines that the frequency of the tracking error signal is lower than the reference signal; a detection device that detects the offset of the tracking error signal by using the detection signal and the hold signal; and a removing device that removes the offset detected by the detection device from the tracking error signal.

4 Claims, 8 Drawing Sheets

TRACKING ERROR SIGNAL COMPENSATION CIRCUIT AND TRACKING ERROR SIGNAL COMPENSATION METHOD

This is a divisional of U.S. Ser. No. 09/393,107 filed on Sep. 9, 1999 U.S. Pat. No. 6,526,006.

BACKGROUND OF THE INVENTION

1. Field of the Invention

The present invention relates to a tracking servo control for enabling a radiation position of a light beam to follow a track of a recording disk, and more particularly relates to a tracking error signal compensation circuit and a tracking error signal compensation method for removing an offset of a tracking error signal used for a tracking servo control.

2. Description of the Related Art

The tracking servo control is carried out when reproducing a recording disk, such as an optical disk, a magneto-optical disk or the like. The tracking servo control is the control for enabling a radiation position of a light beam to follow a track formed on the recording disk.

A tracking servo circuit is mounted in a reproducing apparatus or a recording apparatus of the recording disk. The tracking servo circuit uses a reflection light generated by the radiation of the light beam to the recording disk to thereby generate a tracking error signal. The tracking error signal is a signal in which an amplitude is changed on the basis of a deviation between a track position and the radiation position of the light beam. The amplitude of the tracking error signal is at a zero level when the radiation position of the light beam is located directly over the track. Thus, the tracking servo circuit controls the radiation position of the light beam so that the amplitude of the tracking error signal becomes at the zero level. As a result, the radiation position of the light beam follows the track.

However, when the offset is included in the tracking error signal, a deviation corresponding to the offset is induced between the track position and the radiation position of the light beam, even if the radiation position of the light beam is controlled such that the amplitude of the tracking error signal is at the zero level. This results in an inaccurate operation of the tracking servo control. This offset is caused by the variation of performances of respective elements constituting the tracking servo circuit or the optical pickup and the like, in many cases.

For this reason, the tracking error signal compensation circuit is mounted in the tracking servo circuit. The tracking error signal compensation circuit is also referred to as a tracking balance circuit. This circuit is intended to remove the offset in the tracking error signal.

The tracking error signal compensation circuit is provided with: a low pass filter (LPF) for extracting a direct current component, namely, an offset component from the tracking error signal; a comparator for comparing the offset component with a reference value and then outputting a difference between them; and an adder (or a subtracter) for adding the difference on the tracking error signal (or subtracting the difference from the tracking error signal).

A process of removing the offset from the tracking error signal is carried out before reproducing information recorded on the recording disk, for example, immediately after the recording disk is installed in the reproducing apparatus. Immediately after the installation of the recording disk, the reproducing apparatus rotates the recording disk and radiates the light beam to the recording disk, in a condition that a feedback loop of the tracking servo control is opened. At this time, if the recording disk is eccentric, the recording disk is reciprocated in a radius direction thereof with respect to the fixed radiation position of the light beam. Accordingly, the light beam strides the tracks formed on the recording disk many times. The amplitude of the tracking error signal is changed into a substantially sine wave form, while the radiation position of the light beam is shifted from a position directly over the track to a position directly over the adjacent track. For this reason, the tracking error signal of a successively sine wave form can be generated if the light beam strides the tracks formed on the recording disk many times. The tracking error signal compensation circuit passes this tracking error signal through the low pass filter to thereby extract the direct current component thereof, namely, the offset component. Then, the difference between the offset component and the reference value is generated by the comparator. This difference is added to (or subtracted from) the tracking error signal. Accordingly, the offset of the tracking error signal is removed.

As mentioned above, if the recording disk is eccentric, the recording disk is reciprocated in the radius direction with respect to the fixed radiation position of the light beam. So, if the reciprocation of the recording disk is observed with the fixed radiation position of the light beam as a standard point, a moving speed of the recording disk is the slowest when a moving direction of the recording disk is switched to the reverse direction at an end of the reciprocation. On the other hand, the moving speed of the recording disk is relatively fast while the recording disk is moved from one end of the reciprocation to the other end.

A frequency of the tracking error signal is changed in response to such a change of the speed of the reciprocation of the recording disk. Thus, the frequency of the tracking error signal is the lowest when the moving direction of the recording disk is switched to the reverse direction.

In order to extract the offset component in the tracking error signal by using the low pass filter mounted in the tracking error signal compensation circuit, it is necessary to make a cutoff frequency of the low pass filter sufficiently lower than the lowest frequency of the tracking error signal. If the cutoff frequency of the low pass filter is made lower, a time constant is made larger. Thus, a time until an output of the low pass filter is stable is made longer. This results in a problem that a time of the process of removing the offset from the tracking error signal is long.

On the other hand, as mentioned above, the process of removing the offset from the tracking error signal is carried out before reproducing the information recorded on the recording disk, for example, immediately after the recording disk is installed in the reproducing apparatus. However, even if the offset is removed from the tracking error signal immediately after the installation of the recording disk, this process has a problem that the offset may be induced in the tracking error signal during the reproduction of the recording disk. In addition, the recording apparatus of the recording disk has the problems similar to those of the reproducing apparatus.

SUMMARY OF THE INVENTION

It is therefore a first object of the present invention to provide a tracking error signal compensation circuit and a tracking error signal compensation method which can shorten the time of the process of removing the offset from the tracking error signal.

A second object of the present invention is to provide a tracking error signal compensation circuit and a tracking error signal compensation method which can remove the offset in the tracking error signal induced during the reproducing operation or the recording operation.

A tracking error signal compensation device in accordance with the present invention is a device or a circuit for removing an offset of a tracking error signal to be used for a tracking servo control for causing a radiation position of a light beam radiated by an optical pickup to follow to a track of a recording disk.

The tracking error signal compensation device includes: a low pass filter that extracts a direct current component and a low frequency component whose frequency is lower than a reference frequency from the tracking error signal, and generates a detection signal including the extracted direct current component and the extracted low frequency component; a determination device that determines whether or not a frequency of the tracking error signal is lower than a reference frequency; a holding device that generates a hold signal by holding the detection signal generated by the low pass filter, while the determination device determines that the frequency of the tracking error signal is lower than the reference signal; a detection device that detects the offset of the tracking error signal by using the detection signal and the hold signal; and a removing device that removes the offset detected by the detection device from the tracking error signal.

The tracking error signal is obtained from the optical pickup. The obtained tracking error signal is supplied to the tracking error signal compensation device. In the tracking error signal compensation device, the tracking error signal is supplied to the low pass filter and the determination device. The low pass filter extracts a direct current component and a low frequency component whose frequency is lower than a reference frequency from the tracking error signal, and generates a detection signal including the extracted direct current component and the extracted low frequency component. The detection signal is supplied to the holding device. The determination device determines whether or not a frequency of the tracking error signal is lower than a reference frequency. The holding device generates a hold signal by holding the detection signal, while the determination device determines that the frequency of the tracking error signal is lower than the reference signal. The detection signal and the hold signal are supplied to the detection device. The detection device detects the offset of the tracking error signal by using the detection signal and the hold signal. The removing device removes the offset detected by the detection device from the tracking error signal.

The detection of the offset of the tracking error signal needs to extract the direct current component from the tracking error signal. The extraction of the direct current component can be done with the low pass filter. However, as mentioned above, the frequency of the tracking error signal is partly low. That is to say, the tracking error signal contains a low frequency component.

If only the direct current component is perfectly extracted from the tracking error signal with a low pass filter, it is needed to use a low pass filter whose cutoff frequency is lower enough to cut the low frequency component. However, the use of such a low pass filter makes the operation of the tracking error signal compensation device slow, because the time constant of the low pass filter is large.

To solve this problem, the low pass filter of the tracking error signal compensation device in accordance with the present invention allows to pass not only the direct current component in the tracking error signal but also the low frequency component in the tracking error signal whose frequency is lower than the reference frequency. This means that the cutoff frequency of this low pass filter is relatively high, so that the time constant of the low pass filter is relatively small. Therefore, the low pass filter operates quickly.

The low pass filter of the tracking error signal compensation device in accordance with the present invention outputs the detection signal containing the direct current component and the low frequency component. Therefore, if the detection of the offset of the tracking error signal is carried out by using of this detection signal, it is needed to remove the low frequency component from the detection signal.

The removal of the low frequency component from the detection signal is done by the determination device that determines the frequency of the tracking error signal and the holding device that generates the hold signal. The determination device determines whether or not the frequency of the tracking error signal is lower than the reference frequency. On the basis of determination of the determination device, it is possible to recognize a location or time that the low frequency component appears in the detection signal. On the basis of the determination of the determination device, the holding device holds the detection signal. Thus, the hold signal representing an artificial direct current component of the tracking error signal is generated, and the low frequency component in the detection signal is replaced with the hold signal. Accordingly, the low frequency component is removed from the detection signal.

In this manner, the direct current component of the tracking error signal is substantially perfectly extracted, so that the detection of the offset of the tracking error signal and the removal of the offset from the tracking error signal can be done.

Accordingly, the quick operation of the low pass filter and the removal of the offset from the tracking error signal can be simultaneously achieved. Thus, a tracking error signal compensation circuit which can shorten the time of the process of removing the offset from the tracking error signal can be provided.

A tracking error signal compensation device in accordance with another aspect of the present invention includes: a track jump detection device that detects a track jump of the optical pickup; a detection device that detects the offset of the tracking error signal; and a removing device that removes the offset detected by the detection device from the tracking error signal. In this tracking error signal compensation device, the detection device and the removing device are carried out removal of the offset from the tracking error signal, when the track jump detection device detects the track jump of the optical pickup.

The tracking error signal can be obtained from the optical pickup at the time of the track jump. For example, the optical pickup is moved in the radial direction of the recording disk at the time of the track jump. If the optical pickup continues to radiate the light beam to the recording while the optical pickup is moved in the radial direction of the recording disk, the tracking error signal is thus obtained, because the light beam strides tracks.

The tracking error signal compensation device in accordance with the present invention carries out the removal of the offset from the tracking error signal by using the tracking error signal obtained at the time of track jump. Thus, a tracking error signal compensation circuit which can remove the offset in the tracking error signal induced during the reproducing operation or the recording operation can be provided.

A tracking error signal compensation method in accordance with the present invention is a method of removing an offset of the tracking error signal. The method includes the processes of: extracting a direct current component and a low frequency component whose frequency is lower than a reference frequency from the tracking error signal by a low pass filter, and generating a detection signal including the extracted direct current component and the extracted low frequency component; determining whether or not a frequency of the tracking error signal is lower than a reference frequency; generating a hold signal by holding the detection signal generated by the low pass filter, while it is determined in the determination process that the frequency of the tracking error signal is lower than the reference signal; detecting the offset of the tracking error signal by using the detection signal and the hold signal; and removing the detected offset from the tracking error signal. By this method, the time of the process of removing the offset from the tracking error signal can be shorten.

A tracking error signal compensation method in accordance with another aspect of the present invention includes the processes of: detecting a track jump of the optical pickup; detecting the offset of the tracking error signal, when the track jump is detected; and removing the detected offset from the tracking error signal. By this method, removal of the offset in the tracking error signal induced can be carried out during the reproducing operation or the recording operation.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Embodiments of the present invention will be described below with reference to the drawings. In the following embodiments, a case is exemplified in which a tracking error signal compensation circuit and a tracking error signal compensation method according to the present invention are applied to a reproducing apparatus of an optical disk.

(1) Reproducing Apparatus

Figure 1:
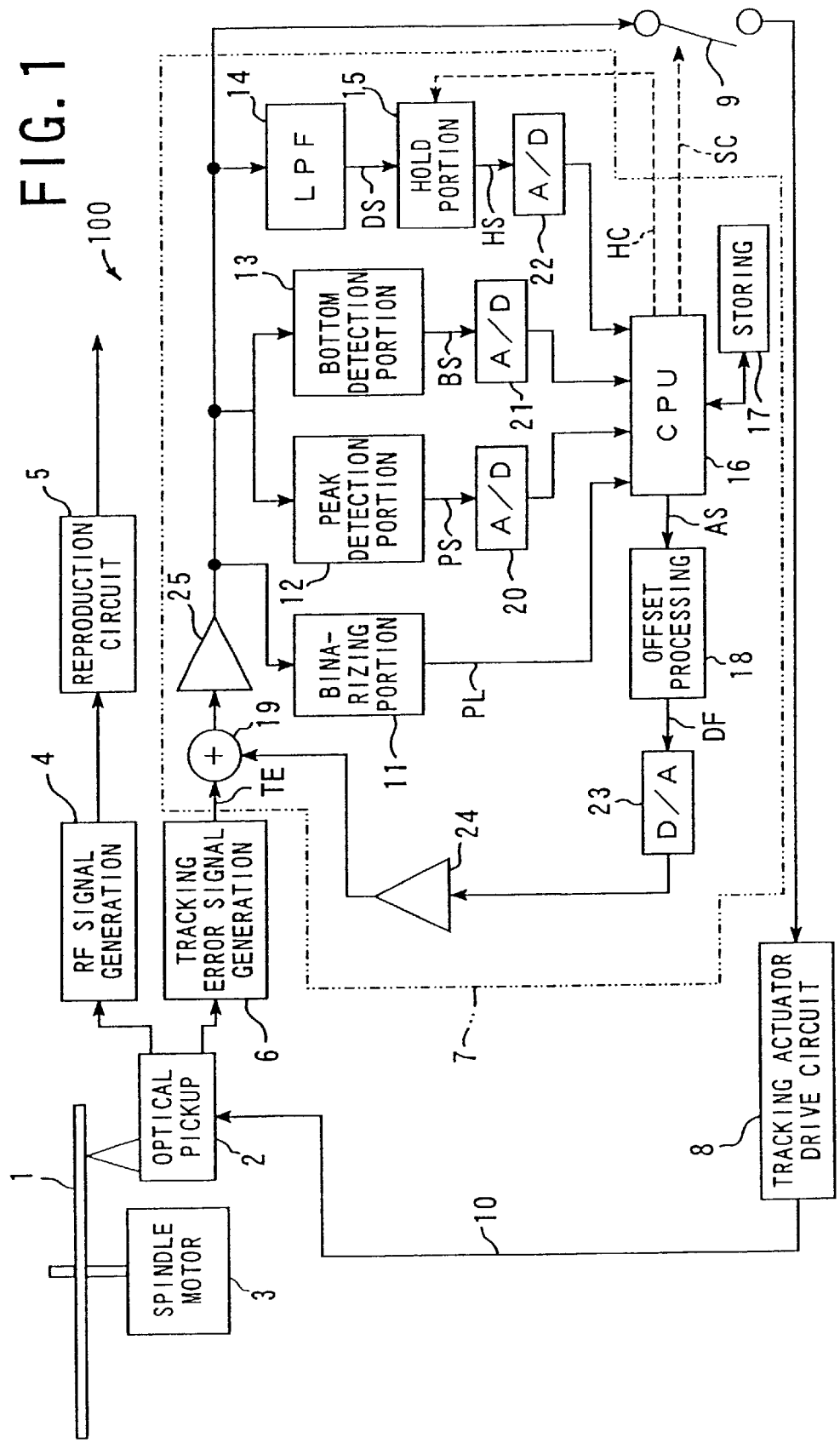
FIG. 1 is a block diagram showing a reproducing apparatus according to an embodiment of the present invention.

FIG. 1 shows a reproducing apparatus 100 according to the embodiment of the present invention. The reproducing apparatus 100 is a device for reproducing information recorded on an optical disk 1. As shown FIG. 1, the reproducing apparatus 100 is provided with an optical pickup 2, a spindle motor 3, an RF (Radio Frequency) signal generation circuit 4, a reproduction circuit 5, a tracking error signal generation circuit 6, a tracking error signal compensation circuit 7, a tracking actuator drive circuit 8 and a switch 9.

The optical disk 1 is, for example, a DVD, a CD or the like. A track, which is spirally or concentrically extended, is formed on a record surface of the optical disk 1. Information is recorded on this track.

The optical pickup 2 has an objective lens for collecting a light beam on the optical disk 1, and a tracking actuator for moving this objective lens in a radius direction of the optical disk 1 (both of them are not shown).

The spindle motor 3 is a motor for rotating the optical disk 1. The RF signal generation circuit 4 is a circuit for generating an RF signal in accordance with a signal read out from the optical disk 1 by the optical pickup 2. The reproduction circuit 5 is a circuit for decoding the RF signal and then generating a reproduction signal of actually reproducing the information recorded on the optical disk 1.

The tracking error signal generation circuit 6 is a circuit for generating a tracking error signal TE by using the signal read out from the optical disk 1 by the optical pickup 2. The tracking error signal TE is generated by using a push-pull method, a heterodyne method, a directly detection method of a three spots system, or the like.

The tracking error signal compensation circuit 7 is a circuit for carrying out a process of removing an offset from the tracking error signal TE.

The tracking actuator drive circuit 8 is a circuit for generating a drive signal to drive an actuator mounted in the optical disk 1 by using the tracking error signal TE.

The switch 9 is a switch for switching between an open state and a close state of a control loop 10. The control loop 10 is a loop to carry out a tracking servo control. The optical pickup 2, the tracking error signal generation circuit 6, the tracking error signal compensation circuit 7, the tracking actuator drive circuit 8 and the switch 9 are connected to this control loop 10. This switch 9 is connected between the tracking error signal compensation circuit 7 and the tracking actuator drive circuit 8, in this control loop 10. An open/close state of the switch 9 is controlled in accordance with a switch control signal SC outputted by a CPU 16 as described later.

The tracking servo control in the reproducing apparatus 100 will be described below with reference to FIG. 1. The tracking servo control is a control of enabling the radiation position of the light beam radiated from the optical pickup 2 to the optical disk 1 to follow the track of the optical disk 1. When the information recorded on the optical disk 1 is reproduced, the spindle motor 3 rotates the optical disk 1, and the optical pickup 2 radiates the light beam to the record surface of the optical disk 1. The optical pickup 2 then receives a reflection light of the light beam, and then outputs a signal corresponding to the reflection light. The tracking error signal generation circuit 6 receives this signal, and uses this signal to generate the tracking error signal TE. This tracking error signal TE is a signal in which an amplitude is changed on the basis of the deviation between the track and the radiation position of the light beam. The tracking error signal compensation circuit 7 receives the tracking error signal TE from the tracking error signal generation circuit 6, and then removes an offset included in the tracking error signal TE. During the reproduction of the optical disk 1, the switch 9 is closed except a track jump operation and the like. Thus, the tracking error signal TE from which the offset is removed is sent from the tracking error signal compensation circuit 7 through the switch 9 to the tracking actuator drive circuit 8. The tracking actuator drive circuit 8 receives this tracking error signal TE, and then generates the drive signal corresponding to this tracking error signal TE. This drive signal is outputted from the tracking actuator drive circuit 8 to the actuator of the optical pickup 2. The actuator of the optical pickup 2 moves the objective lens mounted in the optical pickup 2 in the radius direction of the optical disk 1, in accordance with this drive signal. Accordingly, the radiation position of the light beam is adjusted so as to be located directly over the track.

(2) Tracking Error Signal Compensation Circuit

Figure 7:
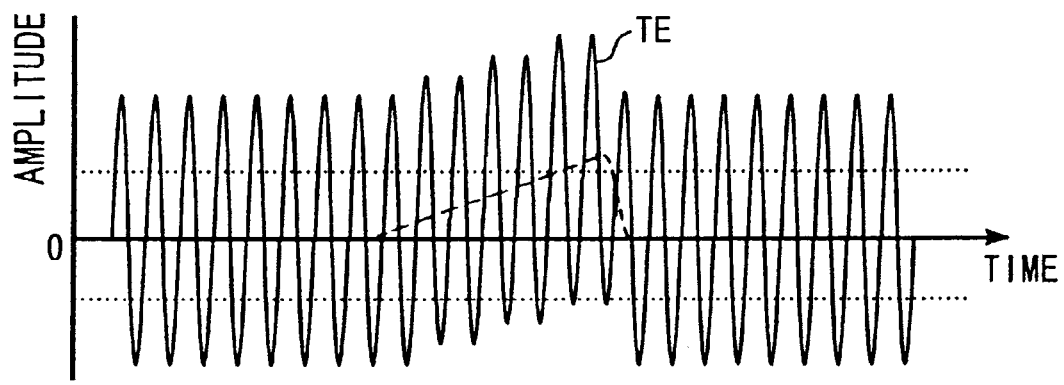
FIG. 7 is a wave form view showing a tracking error signal at a time of a long jump in the embodiment of the present invention.

The tracking error signal compensation circuit 7 will be described below in further detail with reference to FIG. 7.

As shown in FIG. 1, the tracking error signal compensation circuit 7 is provided with a binarizing portion 11, a peak detection portion 12, a bottom detection portion 13, a low pass filter 14, a hold portion 15, the CPU 16, a storing portion 17, an offset processing portion 18 and an adder 19. Moreover, the tracking error signal compensation circuit 7 is provided with: analog-digital converters 20 to 22 for converting a peak signal PS, a bottom signal BS and a detection signal DS (including a hold signal HS), which are outputted from the peak detection portion 12, the bottom detection portion 13 and the hold portion 15 to the CPU 16, respectively, into digital signals; a digital-analog converter 23 for converting an addition signal DF outputted from the offset processing portion 18 to the adder 19, into a digital signal; an amplifier 24 for amplifying the addition signal DF converted into an analog signal; and an amplifier 25 for amplifying the tracking error signal TE passed through the adder 19.

Figure 4:
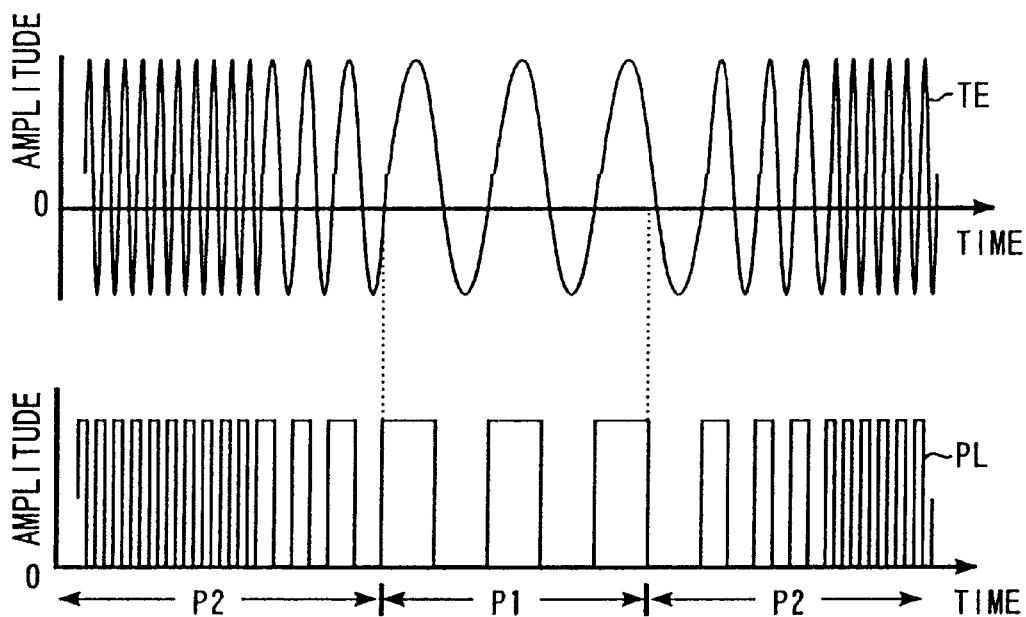
FIG. 4 is a wave form view showing a tracking error signal and a pulse signal in the embodiment of the present invention.

The binarizing portion 11 converts the tracking error signal TE into a binary value, and then generates a pulse signal PL, and further outputs this pulse signal PL to the CPU 16. The pulse signal PL is a signal having a frequency corresponding to that of the tracking error signal TE, as shown in FIG. 4.

Figure 8:
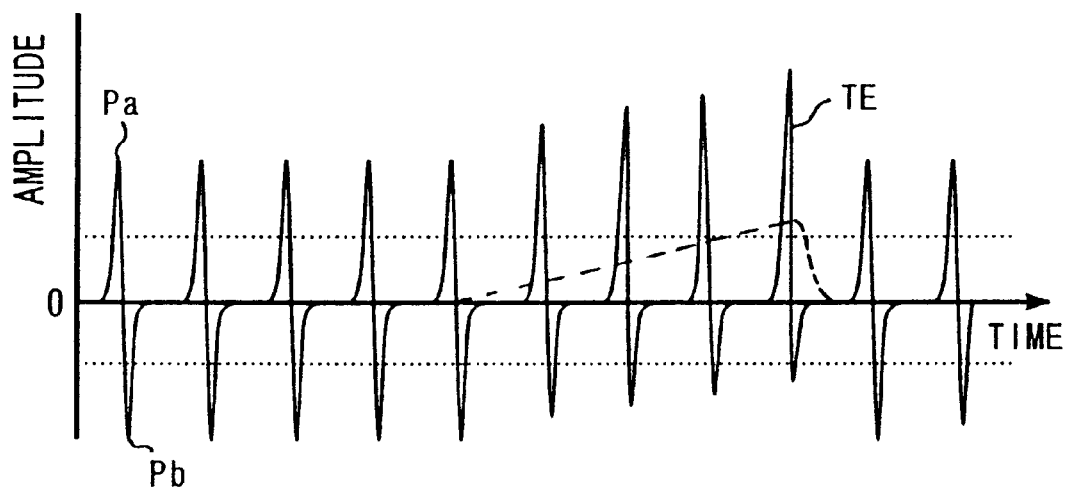
FIG. 8 is a wave form view showing a tracking error signal, when a short jump is carried out a plurality of times, in the embodiment of the present invention.

The peak detection portion 12 detects a peak value of the tracking error signal TE, and then generates the peak signal PS, and further outputs this peak signal PS through the analog-digital converter 20 to the CPU 16. The peak signal PS is a signal indicating a positive peak value Pa of the amplitude of the tracking error signal TE, as shown in FIG. 8.

The bottom detection portion 13 detects a bottom value of the tracking error signal TE, and then generates the bottom signal BS, and further outputs this bottom signal BS through the analog-digital converter 21 to the CPU 16. The bottom signal BS is a signal indicating a negative peak value, namely, a bottom value Pb of the amplitude of the tracking error signal TE, as shown in FIG. 8.

The low pass filter 14 mainly extracts a direct current component included in the tracking error signal TE, and then outputs this direct current component as the detection signal DS through the hold portion 15 and the analog-digital converter 22 to the CPU 16. Furthermore, the low pass filter 14 does not need to perfectly remove a low frequency component included in the tracking error signal TE. That is, a part of the low frequency component of the tracking error signal TE may be included in the detection signal DS. Concretely, the low pass filter 14 is allowed to pass the low frequency component of the tracking error signal TE whose frequency is lower than a predetermined reference frequency.

The hold portion 15, when the frequency of the tracking error signal TE is lower than the reference frequency, holds the detection signal DS outputted from the low pass filter 14 to thereby generate the hold signal HS. Whether or not the detection signal DS is held by the hold portion 15 is controlled by a hold control signal HC outputted by the CPU 16. By such an operation of the hold portion 15, the low frequency component having a frequency lower than the reference frequency is replaced with the hold signal HS.

The CPU 16 carries out an open/close control of the switch 9, the tracking error signal compensation process, the hold process and the like, as described later. The storing portion 17 is connected to the CPU 16. The storing portion 17 stores therein a program to carry out the open/close control of the switch 9, the tracking error signal compensation process, the hold process and the like, respective reference values, such as a zero level reference value, a reference offset value, a reference pulse width and the like. The storing portion 17 is also used as a storing unit for recording data necessary for the tracking error signal compensation process and the like.

The offset processing portion 18 generates the addition signal DF, and then outputs this addition signal DF through the digital-analog converter 23 and the amplifier 24 to the adder 19. The addition signal DF is a digital signal immediately after outputted by the offset processing portion 18. However, the addition signal DF is converted into an analog direct current signal by the digital-analog conversion, and sent to the adder 19.

The offset processing portion 18 maintains an output of this addition signal DF while the optical disk 1 is at least reproduced. Also, in a later-described tracking error signal compensation process, the offset processing portion 18, when receiving an adjustment signal AS from the CPU 16, changes a level of the addition signal DF (namely, a voltage level after the digital-analog conversion) by a predetermined amount, in accordance with this adjustment signal AS.

The adder 19 adds the addition signal DF outputted by the offset processing portion 18, to the tracking error signal TE outputted by the tracking error signal generation circuit 6.

(3) Tracking Error Signal Compensation Process I

The tracking error signal compensation process prior to the reproduction start will be described below with reference to FIG. 2.

Figure 2:
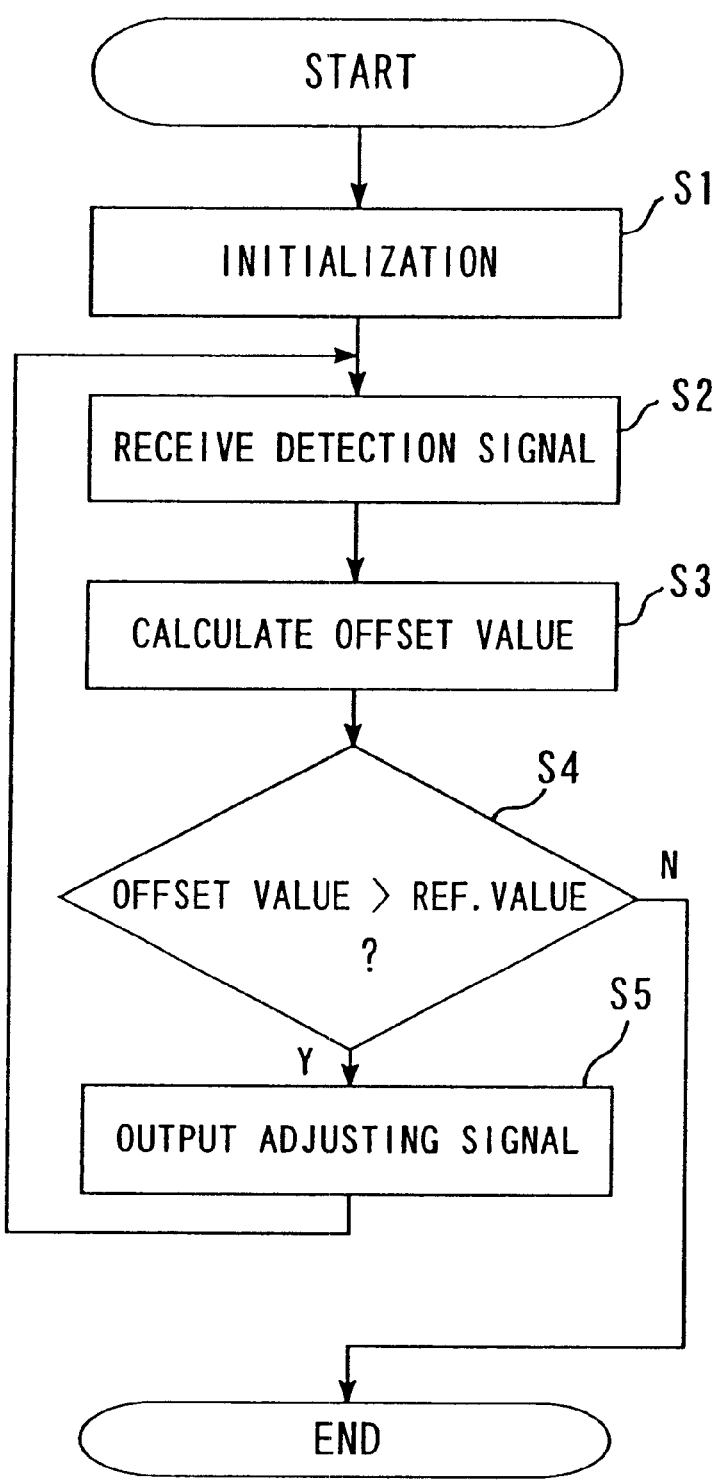
FIG. 2 is a flowchart showing a tracking error signal compensation process executed prior to a reproduction start in the reproducing apparatus according to the embodiment of the present invention.

FIG. 2 is a flowchart showing the tracking error signal compensation process prior to the reproduction start. This tracking error signal compensation process is the process of removing the offset from the tracking error signal TE, before the information recorded on the optical disk 1 is reproduced. This tracking error signal compensation process is carried out under the control of the CPU 16, for example, when the optical disk 1 is installed in the reproducing apparatus 100.

At first, the CPU 16 carries out an initialization process for preparing reproduction of the optical disk 1 (Step 1). In the initialization process, the CPU 16 outputs a switch control signal SC to the switch 9, and then opens the switch 9, so that the control loop 10 opens. At this time, the spindle motor 3 rotates the optical disk 1. The optical pickup 2 radiates the light beam to the optical disk 1. Accordingly, the light beam whose radiation position is fixed is radiated to the record surface of the optical disk 1. This reflection light is detected by the optical pickup 2. Moreover, the signal corresponding to this reflection light is outputted from the optical pickup 2 to the tracking error signal generation circuit 6. Accordingly, the tracking error signal TE is generated by the tracking error signal generation circuit 6. At this time, the offset processing portion 18 outputs the initial addition signal DF to the adder 19. The level of this initial addition signal DF (namely, the voltage level after the digital-analog conversion) is a zero level.

The tracking error signal TE generated by the tracking error signal generation circuit 6 is passed through the adder 19 and the amplifier 25 to the low pass filter 14. Then, the low pass filter 14 extracts the direct current component and the low frequency component whose frequency is lower than the reference frequency in the tracking error signal TE. The direct current component and the low frequency component in the tracking error signal TE is outputted as the detection signal DS to the hold portion 15. Then, the hold process is carried out by the hold portion 15. This hold process is a process of holding the detection signal DS when the frequency of the tracking error signal TE becomes lower than the reference frequency, as described later. The detection signal DS passed through the hold portion 15 is converted into a digital signal by the analog-digital converter 22, and sent to the CPU 16.

The CPU 16 receives the detection signal DS corresponding to the tracking error signal TE (Step 2), and then compares this detection signal DS with the zero level reference value, and further calculates a difference between this detection signal DS and the zero level reference value (Step 3). This difference is an offset value of the tracking error signal TE. Here, the zero level reference value is set to a value equal to the zero level of the tracking error signal TE when the offset is not included.

Next, the CPU 16 determines whether or not the offset value is greater than a reference offset value (Step 4). If the offset value is greater than the reference offset value, the CPU 16 outputs the adjustment signal AS to the offset processing portion 18 (Step 5). The offset processing portion 18 receives this adjustment signal AS, and then changes the level of the addition signal DF by a predetermined amount, in accordance with this adjustment signal AS. Accordingly, a direct current voltage level added to the tracking error signal TE by the adder 19 is increased or decreased by a predetermined amount, in a direction of removing the offset component included in the tracking error signal TE.

The CPU 16 repeats the above-mentioned processes at the steps 2 to 5, until the offset value detected at the step 3 becomes lower than the reference offset value. Accordingly, the offset component is removed from the tracking error signal TE. Then, at the step 4, if the offset value becomes lower than the reference offset value, the tracking error signal compensation process is ended.

(4) Hold Process

The hold process will be described below with reference to FIG. 3.

Figure 3:
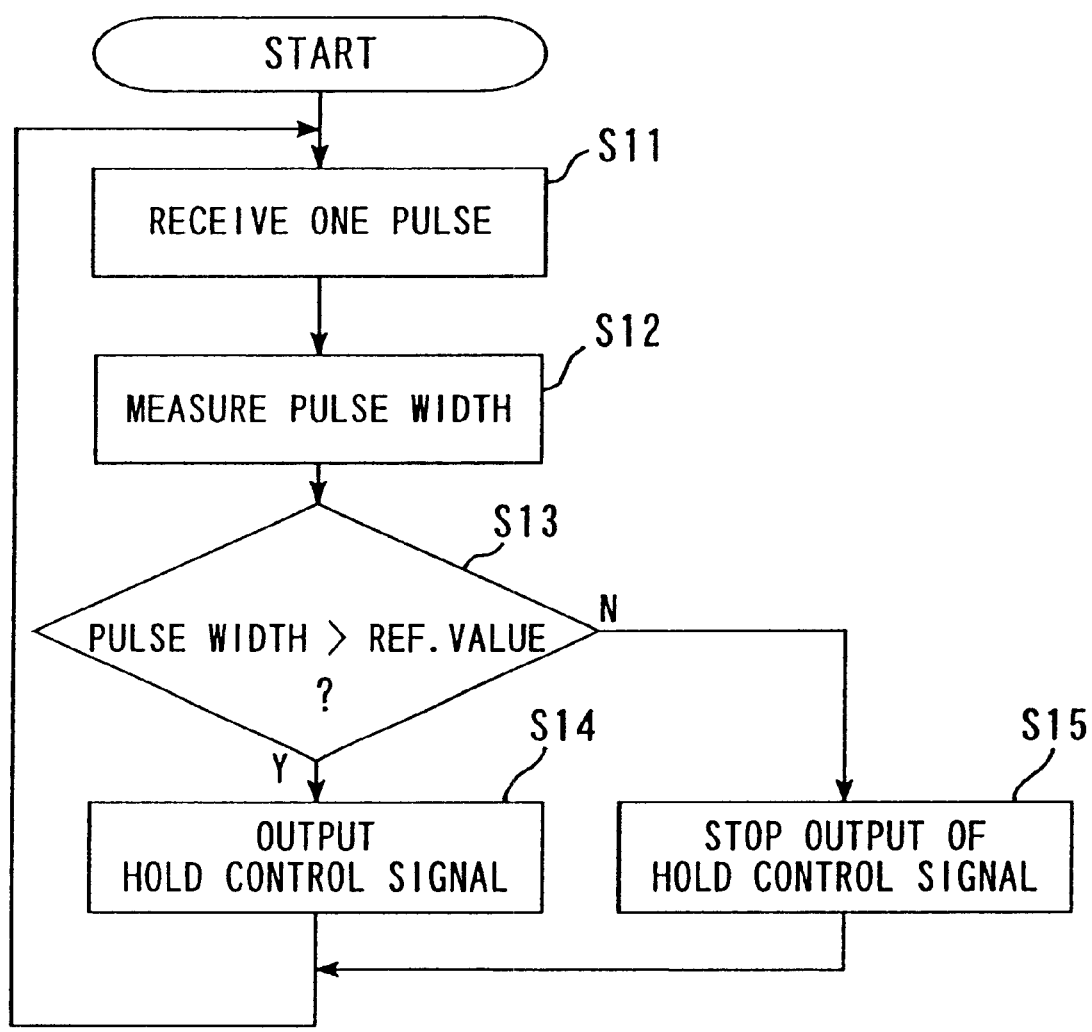
FIG. 3 is a flowchart showing a holding process executed in the reproducing apparatus according to the embodiment of the present invention.

FIG. 3 is a flowchart showing the hold process. The hold process is a process of holding the detection signal DS outputted from the low pass filter 14, when the frequency of the tracking error signal is lower than the reference frequency. The hold process is started after the execution of the initialization process at the step 1 (refer to FIG. 2) in the tracking error signal compensation process, and continues to be executed during the execution of the tracking error signal compensation process. The hold process is executed under the control of the CPU When the initialization process in the tracking error signal compensation process is ended, the tracking error signal TE is sent to the binarizing portion 11 as well as the low pass filter 14. Since the tracking error signal TE is passed through the binarizing portion 11, it is converted into the pulse signal PL and sent to the CPU 16.

The CPU 16 receives one pulse of this pulse signal PL (Step 11), and then measures a pulse width of this one pulse (Step 12). For example, the CPU 16 starts a counter, when recognizing a rising edge of this one pulse. After that, when recognizing a trailing edge of this pulse or a next rising edge, the CPU 16 stops the counter, and then reads in a counter value at that time. The thus-obtained count value implies the pulse width of the one pulse.

FIG. 4 shows the pulse signal PL and the tracking error signal TE immediately after outputted from the tracking error signal generation circuit 6. The pulse signal PL is a signal having a frequency corresponding to that of the tracking error signal TE, as shown in FIG. 4. That is, the pulse width of the pulse signal PL corresponds to a period of the tracking error signal TE. Thus, the frequency of the tracking error signal TE can be recognized by measuring the pulse width of the pulse signal PL. The CPU 16 determines whether or not the pulse width is wider than the reference pulse width to thereby determine whether or not the frequency of the tracking error signal TE is lower than the reference frequency.

When the optical disk 1 installed in the reproducing apparatus 100 is eccentric, the frequency of the tracking error signal TE is periodically changed as shown in FIG. 4. This reason is that since the optical disk 1 is rotated in the eccentric condition, the optical disk 1 is reciprocated in the radius direction thereof with respect to the fixed radiation position of the light beam. That is, as shown in FIG. 4, the moving speed of the optical disk 1 is the slowest at a period P1 when the moving direction thereof is switched to the reverse direction at the end of the reciprocation. Thus, the frequency of the tracking error signal TE becomes the lowest. On the other hand, the moving speed thereof is relatively fast at a period P2 when the optical disk 1 is moved from one end of the reciprocation to the other end. Hence, the frequency of the tracking error signal TE becomes relatively high. The CPU 16 recognizes the frequency of the tracking error signal TE changed by the eccentricity of the optical disk 1, by measuring the pulse width of the pulse signal PL.

At a step 13 of FIG. 3, if the pulse width is wider than the reference pulse width, the CPU 16 outputs the hold control signal HC to the hold portion 15 (Step 14). The hold portion 15 receives the hold control signal HC, and then holds the detection signal DS outputted by the low pass filter 14 at that time, and further generates the hold signal HS. As a result, the low frequency component in the detection signal DS having a frequency lower than the reference frequency is replaced with the hold signal DS.

On the other hand, at the step 13, if the pulse width is not wider than the reference pulse width, the CPU 16 stops the output of the hold control signal HC (Step 15). Accordingly, the hold portion 15 releases the hold of the detection signal DS. As a result, the direct current component in the detection signal DS goes through the hold portion 15.

Then, the CPU 16 repeats the processes at the steps 11 to 15, until the tracking error signal compensation process executed in parallel with the hold process is ended.

Figure 5:
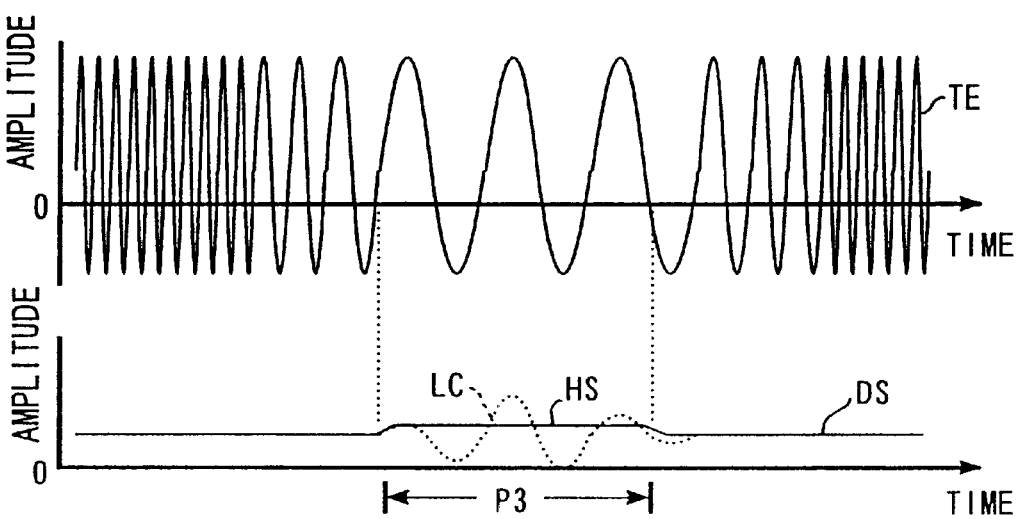
FIG. 5 is a wave form view showing a tracking error signal, a pulse signal and a hold signal in the embodiment of the present invention.

FIG. 5 shows the tracking error signal TE immediately after outputted by the tracking error signal generation circuit 6, the detection signal DS outputted by the hold portion 15, and the hold signal HS generated by the hold portion 15.

In FIG. 5, a period P3 indicates a period at which the pulse width of the pulse signal PL is wider than the reference pulse width. The frequency of the tracking error signal TE is low when the pulse width of the pulse signal PL is wider than the reference pulse width. The period P3 agrees with the period P1 at which the moving direction of the eccentric optical disk 1 is switched to the reverse direction at the end of the reciprocation (FIG. 4). For this reason, if a cutoff frequency of the low pass filter 14 is not set to be sufficiently low, a low frequency component LC remains in the detection signal DS outputted by the low pass filter 14, at the period P3. So, at the hold process, the detection signal DS is held when the pulse width of the pulse signal PL exceeds the reference pulse width. Accordingly, as shown in FIG. 5, the detection signal DS is replaced by the hold signal HS which is a direct current signal and keeps a constant voltage value, at the period P3. Thus, even if the cutoff frequency of the low pass filter 14 is not set to be sufficiently low, it is possible to prevent the low frequency component LC from remaining in the detection signal DS. For example, if the cutoff frequency of the low pass filter 14 is set at a frequency that components in the detection signal DS whose frequency is equal to or higher than the reference frequency can be removed, it is possible to remove the low frequency component LC from the detection signal DS. As a result, the cutoff frequency of the low pass filter 14 can be set to be high to thereby make the time constant of the low pass filter 14 small. The small time constant of the low pass filter 14 enables the detection signal DS outputted by the low pass filter 14 to be quickly stable, and also allows the processing time of the tracking error signal compensation process to be short.

(5) Tracking Error Signal Compensation Process II

The tracking error signal compensation process during the reproduction will be described below with reference to FIG. 6.

Figure 6:
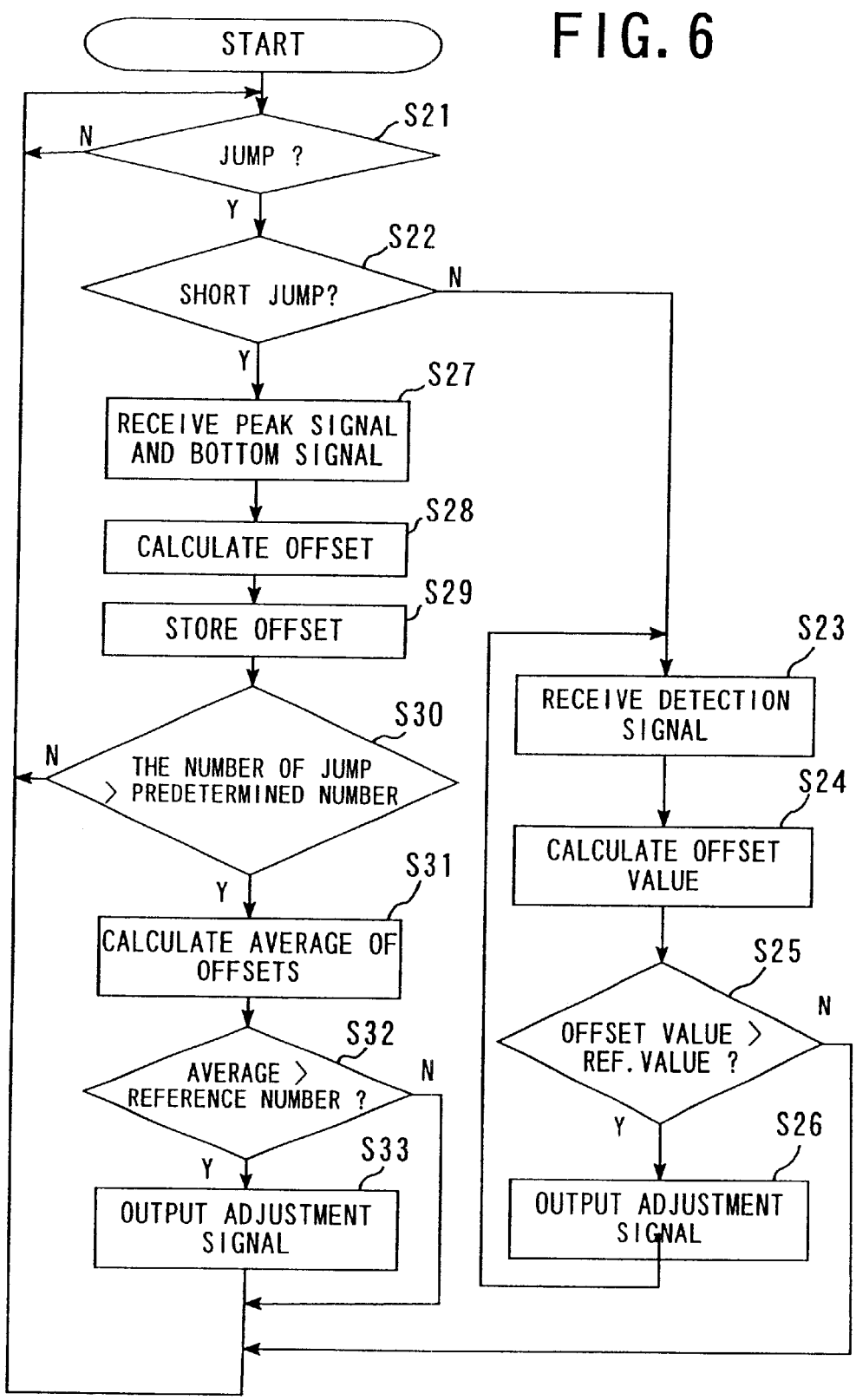
FIG. 6 is a flowchart showing a tracking error signal compensation process executed during the reproducing operation in the reproducing apparatus according to the embodiment of the present invention.

FIG. 6 is a flowchart showing the tracking error signal compensation process during the reproduction. This tracking error signal compensation process is a process of removing the offset from the tracking error signal, when the optical pickup 2 carries out a track jump operation, during the reproduction of the optical disk 1. This tracking error signal compensation process continues to be executed under the control of the CPU 16, while the optical disk 1 is reproduced. In addition, during the execution of this tracking error signal compensation process, the hold process is executed in parallel with this tracking error signal compensation process.

The optical pickup 2 carries out the track jump operation, if a presently-read information and an information to be next read are recorded on tracks different from each other, during the reproduction of the optical disk 1. The CPU 16 determines whether or not such a track jump operation is carried out (Step 11). In addition, the information with regard to the track jump operation of the optical pickup 2 can be obtained from another CPU (not shown) of managing a reproduction order of the information recorded on the optical disk 1 and the like.

When the track jump operation is carried out, the CPU 16 outputs the switch control signal SC, and then opens the switch 9, so that the control loop 10 is opened. Then, the optical pickup 2 moves in the radius direction on the rotating optical disk 1, towards the track on which an information to be next reproduced is recorded, and meanwhile radiates the light beam to the optical disk 1. Accordingly, the tracking error signal TE is generated by the tracking error signal generation circuit 6.

In succession, the CPU 16 determines whether the track jump operation is a short jump or a long jump (Step 22). The short jump implies an operation in which the optical pickup 2 jumps from a track to an adjacent track. The long jump implies an operation in which the optical pickup 2 jumps one track or a plurality of tracks at one time. In addition, the definitions of the short jump and the long jump are not limited to them. The definitions of the short jump and the long jump may be defined depending on whether or not a stable output is obtained from the low pass filter 14 at a time of the track jump operation.

When the track jump operation of the optical pickup 2 is the long jump, the light beam radiated by the optical pickup 2 strides several tracks of the optical disk 1. Thus, the tracking error signal TE, which successively has substantially sine wave forms shown in FIG. 7, is generated by the tracking error signal generation circuit 6. Hence, at a time of the long jump, the CPU 16 uses this tracking error signal TE, and then executes the processes at steps 23 to 26. These processes are similar to the tracking error signal compensation process (the steps 2 to 5 in FIG. 2) carried out before the reproduction of the optical disk 1 is started. Accordingly, the offset can be removed from the tracking error signal TE, while the optical pickup 2 is carrying out the track jump operation, as shown in FIG. 7. Therefore, it is possible to improve the accuracy of the tracking servo control.

On the other hand, when the track jump operation of the optical pickup 2 is the short jump, the optical pickup 2 only moves from a track to an adjacent track. Thus, the tracking error signal TE generated at one track jump operation is a very short signal which includes the substantially sine wave form, correspondingly to only one period.

As the wave form included in the tracking error signal TE is short in the case of the short jump, it is difficult to carry out the processes similar to the tracking error signal compensation process (the steps 2 to 5 in FIG. 2). Thus, in the case of the short jump, the CPU 16 uses the peak signal PS generated by the peak detection portion 12 and the bottom signal BS generated by the bottom detection portion 13, and then detects the offset value of the tracking error signal TE.

That is, the tracking error signal TE generated by the tracking error signal generation circuit 6 is sent to the peak detection portion 12 and the bottom detection portion 13 as well as the low pass filter 14. FIG. 8 shows a wave form of the tracking error signal TE when the short jumps are successively exexuted several times. As shown in FIG. 8, the peak detection portion 12 detects a positive peak value Pa of the tracking error signal TE, and then outputs the peak signal PS indicative of the peak value Pa to the CPU 16. On the other hand, the bottom detection portion 13 detects the bottom value Pb of the tracking error signal TE, and then outputs the bottom signal BS indicative of the bottom value Pb to the CPU 16. The CPU 16 receives the peak signal PS and the bottom signal BS (Step 27), and then calculates the offset value of the tracking error signal TE on the basis of the two signals (Step 28). For example, the offset value of the tracking error signal TE can be calculated by carrying out a calculation of an equation (1):

$$\{(Pa-Pb)/2\}+Pb \tag{1}$$

Next, the CPU 16 stores the calculated offset value in the storing portion 17. Then, the CPU 16 determines whether or not the number of short jumps exceeds a predetermined time (for example, about 30) (Step 30).

The CPU 16 counts the number of short jumps by using the counter and the like, while the short jumps are successively carried out. If the number of short jumps does not exceed a predetermined number, the process proceeds to the step 21. After that, if the short jumps are successively executed, the processes at the steps 27 to 30 are repeated. Thus, a plurality of offset values are stored in the storing portion 17.

If the number of short jumps exceeds the predetermined number, the CPU 16 calculates an average of the offset values accumulated in the storing portion 17 (Step 31). In succession, the CPU 16 determines whether or not this average is greater than the reference offset value (Step 32). If this average is greater than the reference offset value, the CPU 16 outputs the adjustment signal AS to the offset processing portion 18 (Step 33). The offset processing portion 18 receives this adjustment signal AS, and then changes the level of the addition signal DF by the predetermined amount, in accordance with this adjustment signal AS. Accordingly, the direct current voltage level added to the tracking error signal TE by the adder 19 is increased or decreased by the predetermined amount, in the direction of the removal of the offset component included in the tracking error signal TE. Accordingly, the offset incurred when the optical pickup 2 successively carries out the track jump operation can be removed as shown in FIG. 8. A moving distance of the optical pickup 2 is small in the track jump operation. Thus, even if the tracking error signal TE can not be obtained in succession, the offset value of the tracking error signal TE can be accurately removed by using the average of the offset values of the tracking error signal TE which can be intermittently obtained.

(6) Another Embodiment

Figure 9:
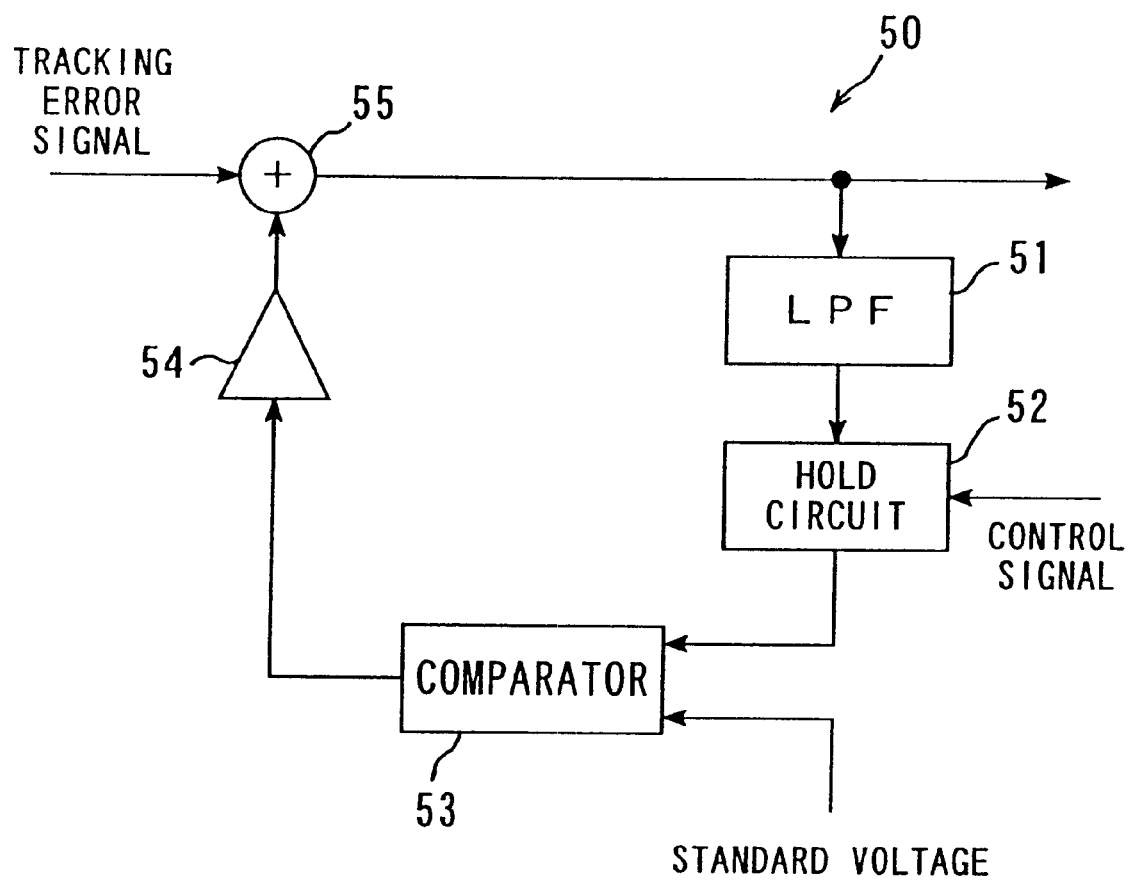
FIG. 9 is a block diagram showing a tracking error signal compensation circuit in another embodiment of the present invention.

FIG. 9 shows another embodiment of the tracking error signal compensation circuit in the present invention. This tracking error signal compensation circuit 50 is provided with a low pass filter 51, a hold circuit 52, a comparator 53, an amplifier 54 and an adder 55. A control signal is sent from external portion to the hold circuit 52, when a frequency of a tracking error signal becomes lower than a reference frequency. The hold circuit 52, when receiving this control signal, holds the tracking error signal passed through the low pass filter 51. The comparator 53 is constituted by an analog circuit, for example, such as an operational amplifier and the like. A standard voltage and the tracking error signal passed through the low pass filter 51 and the hold circuit 52 are sent to this comparator 53. Then, the comparator 53 outputs a difference between the standard voltage and the tracking error signal passed through the low pass filter 51 and the hold circuit 52, to the amplifier 54. According to the tracking error signal compensation circuit 50 having the above-mentioned configuration, since the frequency of the tracking error signal is low, even if a low frequency component included in the tracking error signal cannot be perfectly removed by the low pass filter 51, a portion in which this low frequency component remains can be replaced by a hold signal generated by the hold circuit 52. Accordingly, a cutoff frequency of the low pass filter 51 can be made higher to thereby reduce a time constant of the low pass filter. Hence, a detection signal outputted by the low pass filter can be made stable in a short time.

Figure 10:
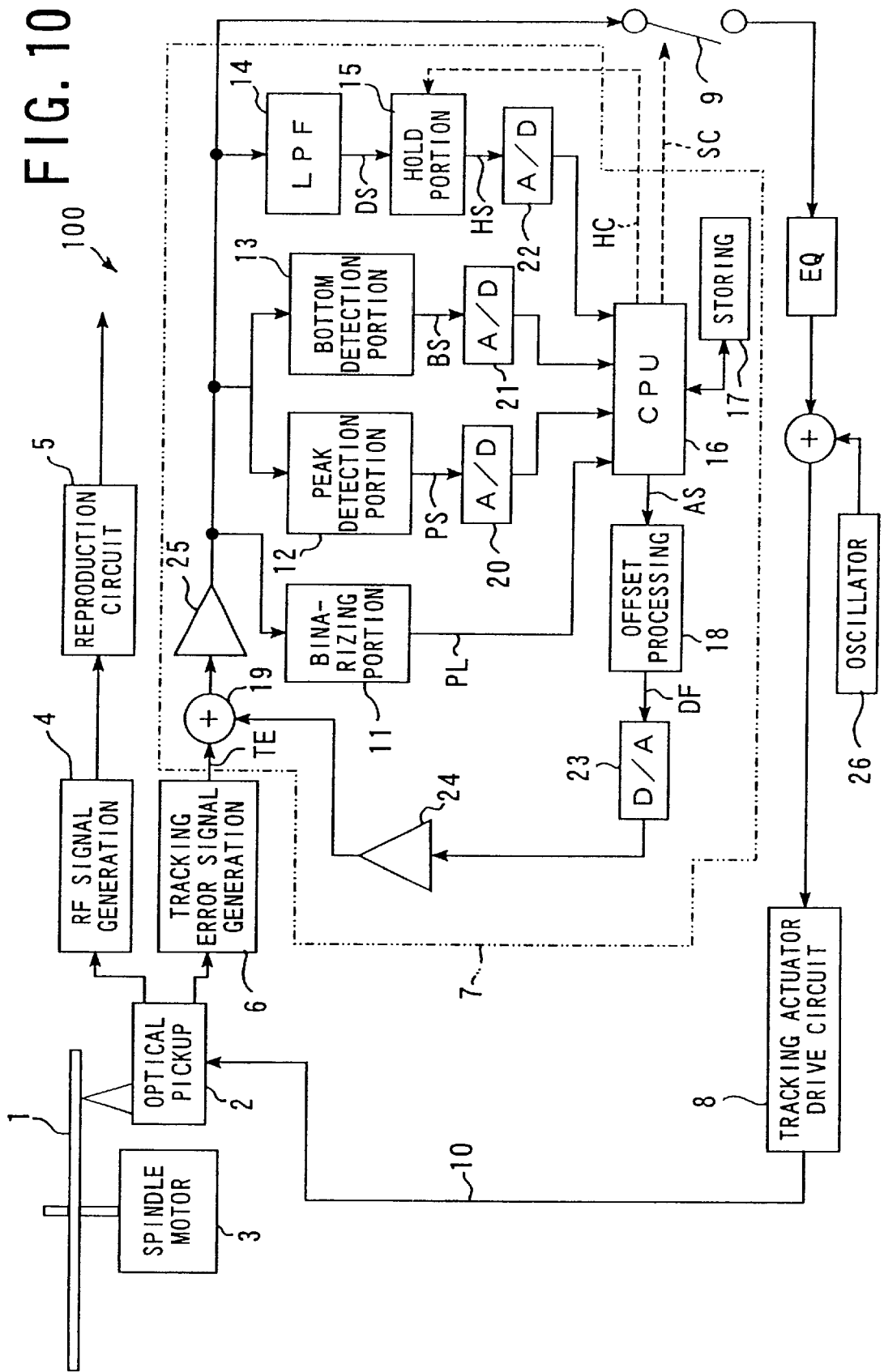
FIG. 10 is a block diagram showing a variation of the reproducing apparatus shown in FIG. 1.

In the tracking error signal compensation circuit 7 (50) according to the above-mentioned embodiments, the radiation position of the light beam is fixed in the tracking error signal compensation process prior to the reproduction start. If the optical disk 1 is eccentric, the optical disk 1 is reciprocated in the radius direction with respect to the fixed radiation position of the light beam 1. Thus, the tracking error signal TE in the form of sine wave can be generated. However, in such a configuration, the tracking error signal TE having a sufficient amplitude can not be generated if the optical disk 1 is not eccentric. So, a disturbance signal generation portion 26 is mounted in the actual tracking error signal compensation circuit 7 (50), as shown in FIG. 10. The disturbance signal generation portion 26, while the tracking error signal compensation process is carried out at a time of the reproduction start, outputs a disturbance signal having a sine wave form of a predetermined frequency, to the tracking actuator drive circuit 8. Accordingly, the optical pickup 2 is oscillated at the predetermined frequency, in the radius direction of the optical disk 1. As a result, the radiation position of the light beam is reciprocated at the predetermined frequency, on the optical disk 1. Thus, the tracking error signal TE having the sufficient amplitude can be generated even if the optical disk 1 is not eccentric.

Also, in the above-mentioned embodiments, the reproducing apparatus is exemplified which reproduces the information recorded on the optical disk. However, the present invention is not limited to such a reproducing apparatus. It may be applied to a recording apparatus for recording the information on the optical disk. Moreover, the present invention is not limited to the reproducing apparatus or the recording apparatus of the optical disk. It may be also applied to a reproducing apparatus and a recording apparatus of another recording disk, such as a magneto-optical disk and the like.

Furthermore, in the above-mentioned embodiments, the tracking error signal is converted into the binary value in order to detect the frequency of the tracking error signal. However, the present invention is not limited to it. Another frequency detection unit can be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-265499 filed on Sep. 18, 1998 including the specification, claims, drawings and summary is incorporated herein by reference in its entirety.

What is claimed is:

1. A tracking error signal compensation device for removing an offset of a tracking error signal to be used for a tracking servo control for causing a radiation position of a light beam radiated by an optical pickup to follow to a track of a recording disk, the tracking error signal compensation device comprising:

a low pass filter that extracts a direct current component and a low frequency component whose frequency is lower than a reference frequency from the tracking error signal, and generates a detection signal including the extracted direct current component and the extracted low frequency component;

a determination device that determines whether or not a frequency of the tracking error signal is lower than a reference frequency;

a holding device that generates a hold signal by holding the detection signal generated by the low pass filter, when the determination device determines that the frequency of the tracking error signal is lower than the reference signal;

a detection device that detects the offset of the tracking error signal by using the detection signal and the hold signal; and a removing device that removes the offset detected by the detection device from the tracking error signal.

2. The tracking error signal compensation device according to claim 1, wherein the holding device replaces the low frequency component included in the detection signal with the hold signal.

3. The tracking error signal compensation device according to claim 1, wherein the determination device comprises:

a conversion device that converts the tracking error signal into a pulse signal whose pulse width corresponds to the frequency of the tracking error signal;

a pulse width measuring device that measures the pulse width of the pulse signal; and a frequency determination device that determines on the basis of the pulse width of the pulse signal whether or not the frequency of the tracking error signal is lower than the reference frequency.

4. A method of removing an offset of a tracking error signal to be used for a tracking servo control for causing a radiation position of a light beam radiated by an optical pickup to follow to a track of a recording disk, the method comprising the processes of:

extracting a direct current component and a low frequency component whose frequency is lower than a reference frequency from the tracking error signal by a low pass filter, and generating a detection signal including the extracted direct current component and the extracted low frequency component;

determining whether or not a frequency of the tracking error signal is lower than a reference frequency;

generating a hold signal by holding the detection signal generated by the low pass filter, when it is determined in the determination process that the frequency of the tracking error signal is lower than the reference signal;

detecting the offset of the tracking error signal by using the detection signal and the hold signal; and removing the detected offset from the tracking error signal.

* * * * *